United States Patent [19]
Lumbis et al.

[11] Patent Number: 5,647,562
[45] Date of Patent: Jul. 15, 1997

[54] ELECTRO-PNEUMATIC BRAKE POWER MANAGEMENT SYSTEM

[75] Inventors: Anthony W. Lumbis, Watertown; Dale R. Stevens, Adams Center, both of N.Y.

[73] Assignee: New York Air Brake Corporation, Watertown, N.Y.

[21] Appl. No.: 621,887

[22] Filed: Mar. 26, 1996

[51] Int. Cl.[6] .................................................... H02J 7/00
[52] U.S. Cl. .................. 246/167 R; 246/1 C; 105/35; 320/43
[58] Field of Search .................. 246/1 C, 167 R, 246/182 B, 245; 105/35, 50; 73/129; 320/2, 17, 43, 48, 15, 45, 27, 29, 30, 47; 395/750

[56] References Cited

U.S. PATENT DOCUMENTS

| | | | |
|---|---|---|---|
| 1,882,501 | 10/1932 | Kellett | 105/50 |
| 4,477,764 | 10/1984 | Pollard | 320/17 |
| 4,487,060 | 12/1984 | Pomeroy | 246/169 R |
| 4,638,237 | 1/1987 | Fernandez | 320/48 |
| 4,702,291 | 10/1987 | Engle | 105/35 |
| 4,900,944 | 2/1990 | Donnelly | 105/35 |
| 5,267,473 | 12/1993 | Bezos et al. | 73/129 |
| 5,293,632 | 3/1994 | Novakovich et al. | 395/750 |
| 5,583,413 | 12/1996 | Proctor et al. | 320/48 |

*Primary Examiner*—Mark T. Le
*Attorney, Agent, or Firm*—Barnes & Thornburg

[57] ABSTRACT

A power management system for an electrified train wherein the voltage of the batteries on the individual cars is provided to the locomotive which determines which cars can charge their batteries with the power from the locomotive based on the available power at the locomotive.

13 Claims, 4 Drawing Sheets

ELECTRO-PNEUMATIC BRAKE POWER MANAGEMENT SYSTEM

BACKGROUND AND SUMMARY OF THE INVENTION

The present invention relates generally to electrified trains and more specifically to a power management system for the batteries on the cars of an electrified train with electro-pneumatic brakes.

The introduction of electro-pneumatically (EP) operated brake systems into the railroad industry has placed an increased demand for electrical power on the locomotive. In freight trains with over one hundred cars, the power requirement is substantial. Even in the battery operated systems, the power required to keep the batteries fully charged can range from 1.0 kW to 3.0 kW, or more, as new features are added to the system. This power is typically taken from the locomotive's low voltage battery/power supply (75VDC) system. Many older locomotives do not have this additional power available and even though the newer locomotives may have the increased power capacity, much of this power is not available for operating "EP" brakes because of the increased number of electrical and electronic devices currently being installed on modern locomotives.

Thus, there is a need to allocate the electrical power available on a train or consist while maintaining the safety of the electrically operated equipment.

Thus, it is an object of the present invention to provide a method of allocating power on an electrified train.

Another object of the present invention is to maintain sufficient power in each car of the train to safely operate the train.

These and other objects are achieved by determining which batteries on the cars of the train have a voltage level below a first value and determining the available power at the locomotive. Then the local batteries are selectively charged from the locomotive based on the available power at the locomotive. The value or the degree of the battery voltage below the first value is determined and priority is set for charging the local batteries. Although preferably, each car requests authorization to charge, a polling of the monitored voltage levels of the batteries at each car may be conducted.

The apparatus required to perform the method is a master controller at the locomotive and local controllers at each car. The local controller monitors the voltage level of its local battery and communicates with the master controller. The master controller uses the information of voltage levels, number of requests and available power and selectively communicates with each of the individual cars to allow the local controllers to charge from the power lines based on available power. For a priority value, the local controller can initiate charging without authorization from the master controller. The cars are interconnected by a trainline which includes power lines. The communication may be transmitted over the power lines or separate communication lines in the trainline.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
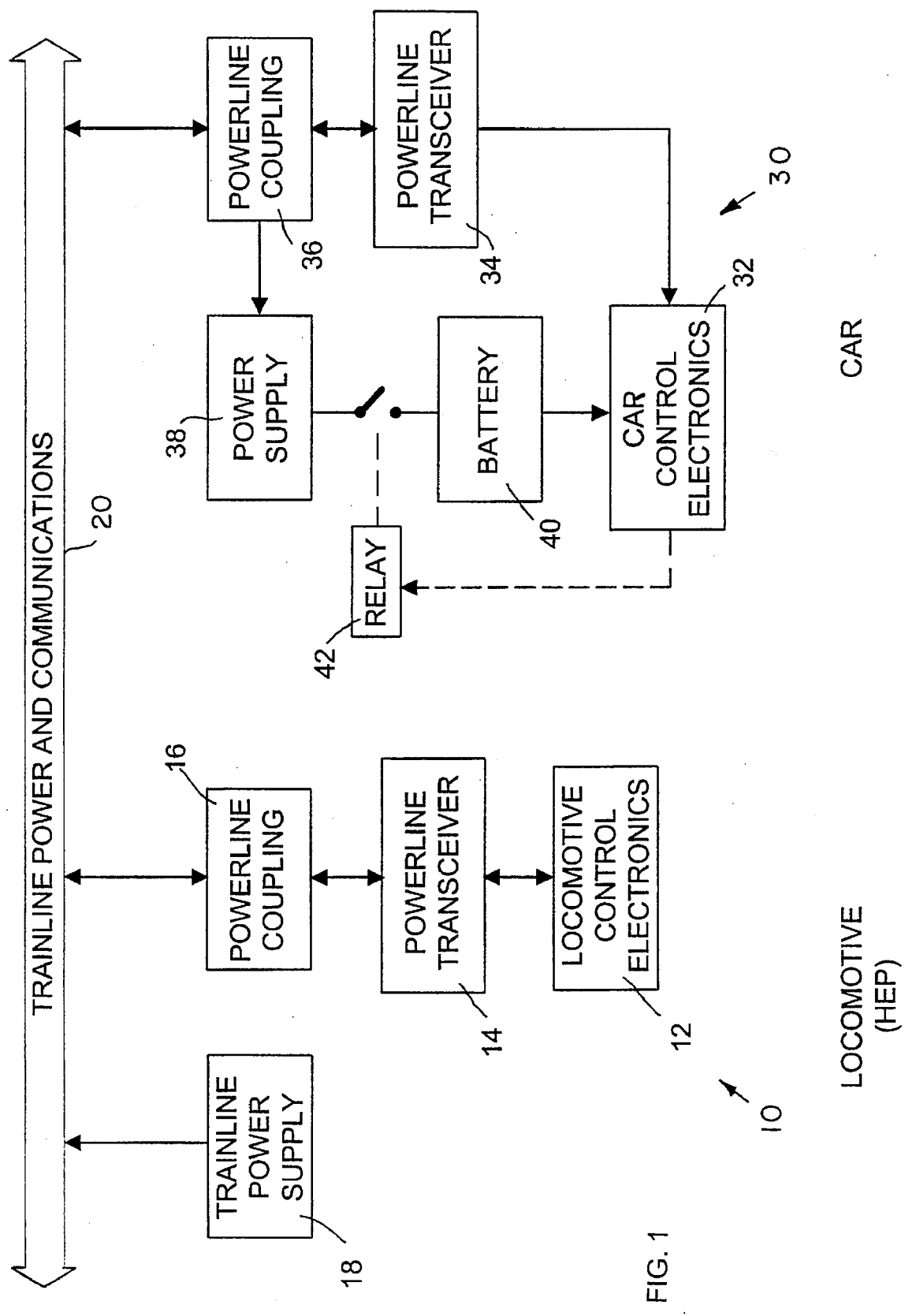
FIG. 1 is a block diagram of a train incorporating the power management system of the present invention.

A train, as illustrated in FIG. 1 includes a locomotive 10 interconnected by a trainline 20 to individual cars 30. The trainline 20 preferably is a pair of power lines, but may include other electric signals or communication lines. The system to be described communicates over the power lines. The power lines and communication lines may be separate within the trainline 20. The locomotive 10 communicates, controls braking and monitors the conditions of individual cars using a locomotive control electronics 12 which preferably is a Neuron chip, as part of a LonWorks communications systems, designed by Echelon Corporation of Palo Alto, Calif. The locomotive control electronics or master controller 12 communicates via power line transceiver 14 connected to the trainline 20 by power line coupling 16. The power line coupling may be, for example, a capacitor and transformer, or simply a capacitor. The description of the locomotive electronics 12 is well known and need not be discussed herein in detail. The locomotive 10 also includes a trainline power supply 18. The power supply 18 is a power source providing generally 160–230 volts AC or DC, in the 1000–1500 watt range.

Each of the individual cars 30 includes a car control electronics 32 connected to the trainline 20 by power line transceiver 34 and power line coupling 36. The braking control electronics also includes a Neuron chip for communication and control. The car control electronics 32 is an example of a local controller and may be used for controlling other electronic systems on each of the individual cars as well as monitoring the systems and conditions at the individual car. Brake control is just used an example of the kind of system which can be used. Similarly, the Neuron chip and LonWorks is a preferred communication regime. Other communication regimes may be used.

The power source for the control electronics 31 on the individual cars 30 is a battery 40. The battery 40 is charged by a power supply 38 which is coupled to the trainline 20 by power line coupling 36. A relay 42 under the control of the local controller 32 selectively controls the charging of the battery 40. Even though the relay 42 is shown as interconnecting the power supply or charger 38 to the battery 40, this relay may be an electro-mechanical relay, an electronic relay or any other device which selectively controls the charging of the battery.

To determine the voltage of the individual batteries 40, the local controller 32 of the individual cars monitors the voltage and communicates the information to the locomotive control electronics 12. The authorization of the individual cars to charge the battery from the trainline 20 with power from the trainline power source 18 is controlled by the locomotive controller 12 via communication over the trainline 20. Which cars will be granted authority to charge and how many at one time, is a function of available power as determined by the locomotive controller 12. The specific decisions being made are illustrated in FIGS. 2 and 3.

Figure 2:
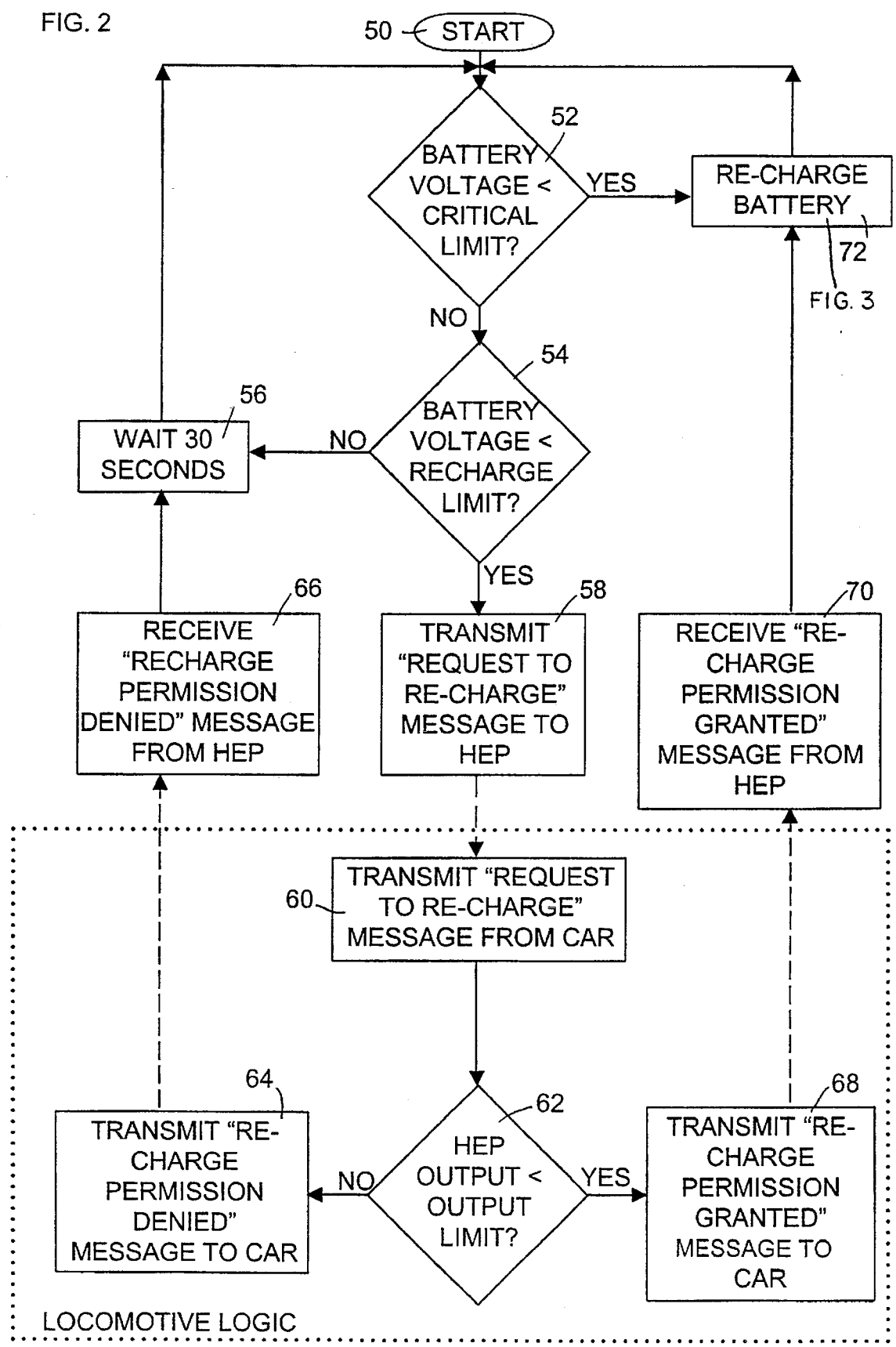
FIG. 2 is a flow chart of the power management system according to the principles of the present invention.
Figure 3:
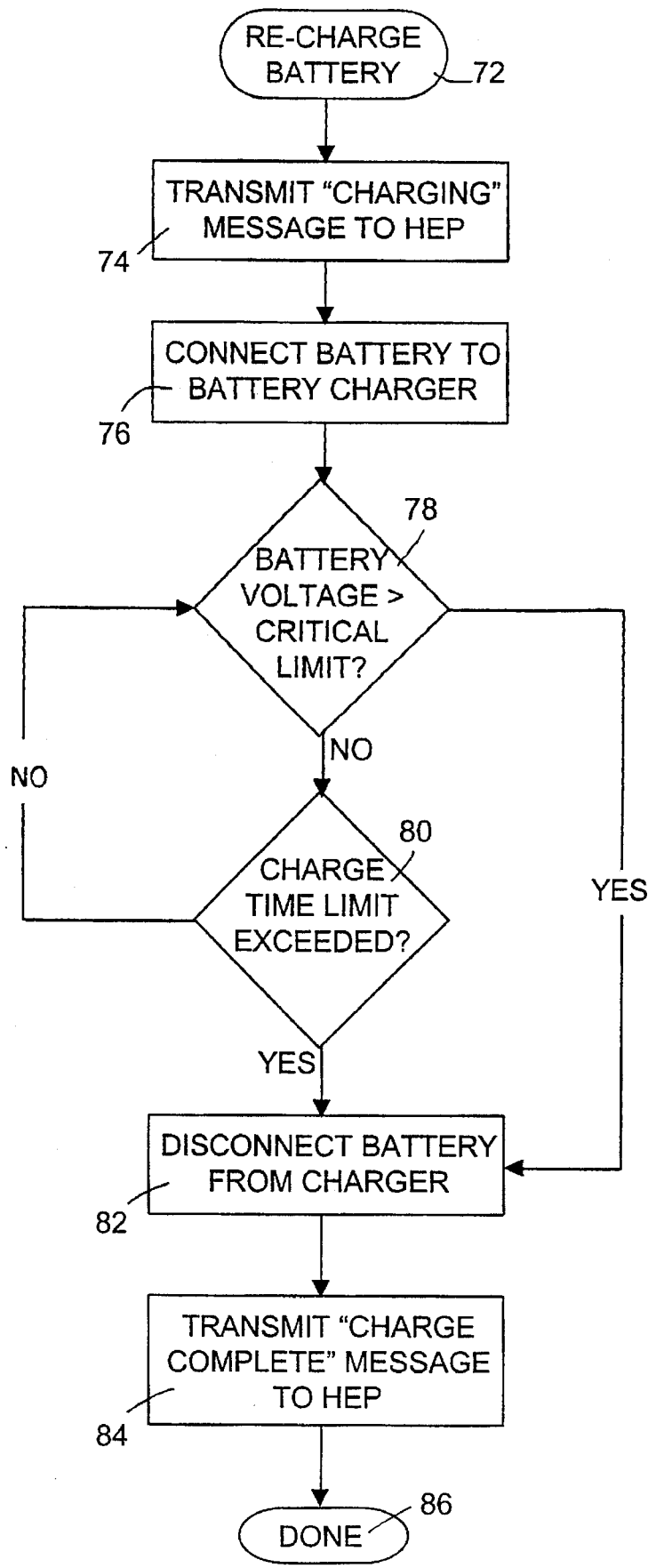
FIG. 3 is a flow chart of the recharging sequence according to the principles of the present invention.

FIG. 2 shows the flow chart for the individual cars and their interconnection to the locomotive. The process begins at 50 at the individual cars for continuously monitoring the voltage level of the individual local batteries by the car control electronics 32. If the local battery voltage is below a critical limit as determined in 52, the local battery is immediately recharged at 72 using the flow chart illustrated in FIG. 3. If the battery voltage is not below a critical limit, a determination is made at 54 whether the battery voltage is below a recharged limit. If it is not, the comparison of the battery voltage against the two limits of box 52 and 54 are reinitiated after a 30-second delay as illustrated by box 56. If the battery voltage is above the critical limit and below the recharge limit, a request to recharge message is transmitted to the locomotive controller (HEP) 12 by box 58 via power line transceiver 34.

The requests to recharge message from the cars as illustrated in box 60, are received by the locomotive control electronics 12. Determination is then made at box 52 on whether the locomotive output or the power available at the trainline power source 18 is less than the output limit. The output limit is the limit of the individual systems, for example, in the range of 1000 to 1500 watts. If the current HEP output is greater than the output limit as determined in box 62, the power line transceiver 14 transmits recharge permission denied signal at box 64. The signal is received at the power line transceiver 34 as illustrated by box 66 and after a 30-second delay provided by box 56, the routine is then again started with comparing the voltage of the local battery against the two limits of box 52 and 54. While the local battery is waiting to retransmit a request to recharge, its voltage may fall below the critical limit and therefore make the local decision to start recharging the battery.

If the current power output at the locomotive is less than the output limit, a recharge permission granted signal as illustrated is transmitted by the power line transceiver 14 to the individual car. This signal is received, as illustrated by box 70, by the power line transceiver 34 in the local car and the recharge battery routine 72 is initiated.

Although the flow chart of FIG. 2 illustrates the power management system responding to recharge request from the individual cars, this is not the only regime of collecting the information which would be used. Alternatively, the locomotive control electronics 12 can poll the individual cars on a regular basis to determine either the actual values of all the voltages in the car and make a determination at the locomotive which cars to recharge or request transmission of a request to recharge signal which is stored locally at the car control electronics 32. It should be noted that it is preferred that the individual cars make a local determination and transmit a recharge request. This minimizes the amount of information on the trainline used for communication. It should also be noted that multi levels of comparison can be made at box 54 and different priorities of request to recharge signals may be transmitted. This will allow the locomotive control electronics 12 to make a more intelligent decision on selecting between which cars shall be recharged. Using the scheme of FIG. 2 without modification would allow selective charging of the cars in the order of the request for recharging.

The recharged battery flow chart in FIG. 3 begins at 72. Upon receipt of the recharged permission grant message from the locomotive, the car electronics 34 transmits a charging message to the locomotive via the power line transceiver 34 and power line coupling 36. This is an acknowledgment signal of a receipt of the recharged permission granted signal and activation of the recharging. The control electronics 32 also activates relay 34 to charge the battery 40 using the power source or converter 38 from the trainline 20 as illustrated by box 76. The battery voltage is monitored at 78 to determine whether it is greater or lower than the charge limit for the battery 40. If it is not greater than that limit, there is a determination at 80 whether the charging time has exceeded a charging time limit, for example, 30 minutes. If it has not, the battery continues to be charged. If the battery voltage exceeds the charging limit or the charging time exceeds the charging time limit, the car control electronics 32 disconnects the battery charger by opening relay 42 as illustrated by box 82. The car control electronics 32 also transmits via power line transmitter 34 and power line coupling 36, a charge completed signal message to the locomotive control electronics 12. The routine is ended at box 86.

It should be noted that when an individual car makes a local decision to immediately begin charging at box 52 and enter the recharge routine at 72, the transmit of a charging message to the locomotive controller 12 indicates to the central control the number of local batteries that are being charged. If the number of local batteries being charged, whether in response to a request to recharge or a local decision to begin charging, the locomotive controller 12 can interrupt the charging of selective cars to prevent the capacity of the system from being exceeded. By comparing the list of the cars that have transmitted a charging message with those that have transmitted a request to recharge and permission to recharge, the locomotive control electronics 12 can indicate which ones have higher priority and which ones to selectively terminate the charging.

It should also be noted that the locomotive control electronics 12 can periodically initiate charging at the individual car by transmitting a recharge permission granted signal to the individual controllers during non-peak demand periods even if no request for charging have been received. For example, all odd cars may be charged during an non-peak period followed by all even cars.

Additionally, when the batteries are charged, the locomotive control electronics may select a maintain charge mode instead of completely terminating the charging operation. In this mode, the power supply would provide only enough current (float current) to maintain a fully charged battery.

Figure 4:
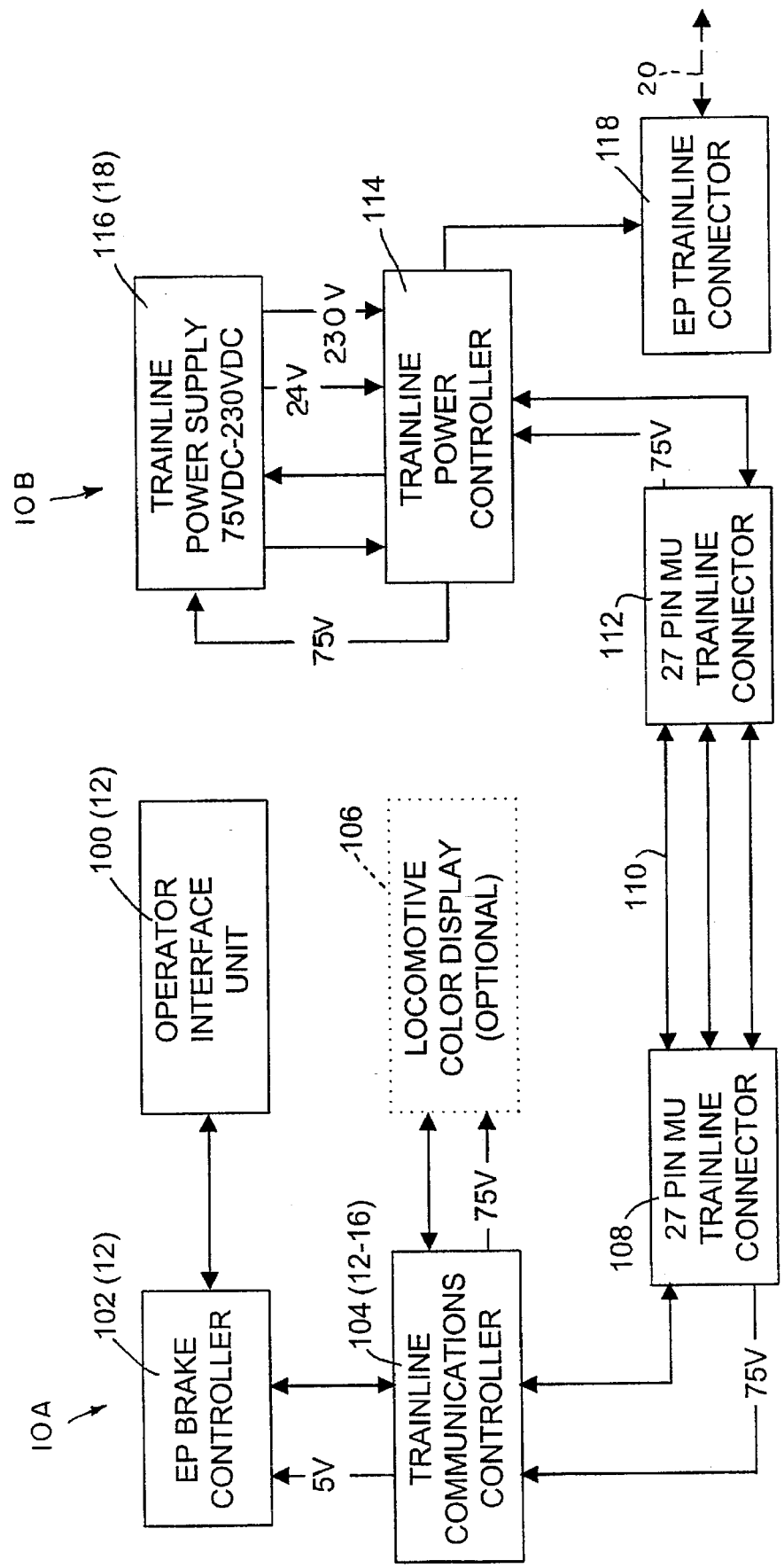
FIG. 4 is a block diagram of a multiple locomotive consist incorporating the principles of the present invention.

A train may include more than one locomotive as illustrated in FIG. 4. Two locomotives, for example, 10A and 10B are shown interconnected by a 27 pin multiple unit trainline 110, each having respective 27 pin connector 108 and 112. The lead locomotive 10A has an operator interface unit 100 connected to the EP brake control 102 which are included in locomotive control electronic 12 of FIG. 1. The trainline communication controller 104 would include elements 12–16 of FIG. 1. A locomotive color display 106 is optional. The trainline communication controller 104 is connected to the unoccupied multi-pin connector 108 of the lead locomotive 10A. The trainline communication control 104 communicates over a pair of the 27 pin or line multiple unit locomotive trainline 110.

In the trailing locomotive 10B, a power line supply 116 is connected to trainline power controller 114. EP trainline connector 118 is connected to the trainline controller 114 which is connected to the unoccupied trailing 27 pin multi-unit trainline connector 112. The trainline power controller 114 may be connected to the EP trainline connector 118 by one or more lines. Alternatively, the EP trainline connector may also be connected to the 27 pin multiple connector 112 for a signal transmission while the trainline power controller 112 provides the high powered voltage connection to the EP trainline connector 118.

The trainline communication controller 104 communicates with the car control electronic 32 and trainline power controller of the trailing locomotive 10B through the 27 pin multi-unit trainline 110 and trainline 20. Once it is determined that the trainline 20 should be energized or powered, the trainline communication controller 104 communicates with the trainline power controller 114 to apply power to the trainline 20. By providing the high power voltage from the trailing locomotive 10B, the 27 pin multi-unit trainline 110 is not energized with the voltage above the 75 volts, for example. This allows for communication through the total train from the lead locomotive and its trainline communication controller 104 while safely energizing the high power, high voltage from the trailing locomotive 10B to the cars in the train.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A train including at least one locomotive and a plurality of cars, each car being serially connected electrically by a trainline to an adjacent car and having a local controller powered by a local battery and controlled by a master controller in said locomotive, wherein:

said local controller monitors the voltage level of its local battery and transmits to said master controller a charging request signal for a battery voltage level below a first value;

said master controller transmits a charging authorization signal to said local controller in response to said request signal; and said local controller charges said local battery with power from said locomotive upon receipt of said authorization signal.

2. A train according to claim 1, wherein said master controller determines availability of power before transmission of said authorization signal.

3. A train according to claim 1, wherein said local controller determines the value of the voltage level below said first value and transmits a priority request signal corresponding to the value.

4. A train according to claim 3, wherein said master controller determines to which local controllers to transmit an authorization signal based on the priority request signals received.

5. A train according to claim 4, wherein said master controller determines availability of power before transmission of authorization signals.

6. A train according to claim 3, wherein said local controller charges said local battery with power from said locomotive upon determining a value below a second value which is less than said first value without receipt of an authorization signal from said master controller.

7. A train according to claim 1, wherein said trainline includes a pair of power lines and said request and authorization signals are sent over said power lines.

8. A train according to claim 1, wherein each car includes electro-pneumatic brakes controlled by said local controller.

9. A train according to claim 1, wherein said local controller charges said local battery with power from said locomotive upon determining a voltage level below a second value which is less than said first value without receipt of an authorization signal from said master controller.

10. A train according to claim 1, wherein said train includes at least a leading and trailing locomotive; and said master controller is in said leading locomotive and said local batteries are charged by power from said trailing locomotive.

11. In a train including at least one locomotive and a plurality of cars, each car being serially connected electrically by a trainline to an adjacent car and having a local controller powered by a local battery and controlled by a master controller in said locomotive, a method of selectively charging local batteries comprising:

determining which local batteries have a voltage level below a first value;

determining availability of power at the locomotive; and selectively charging said local batteries with power from said locomotive based on available power.

12. A method according to claim 11, including determining the value of the voltage level of the local batteries below said first value and prioritizing the local batteries to be charged base on the value of the voltage level.

13. A method according to claim 12, wherein said master controller determines the selective charging and the local controllers only initiate local charging in response to a signal from said master controller or for a voltage level below a second value which is less than said first value.

* * * * *